May 18, 1954 J. BRYER 2,678,565
MECHANISM FOR REPLACING ENDLESS BELTS
Filed Dec. 11, 1951 3 Sheets-Sheet 1
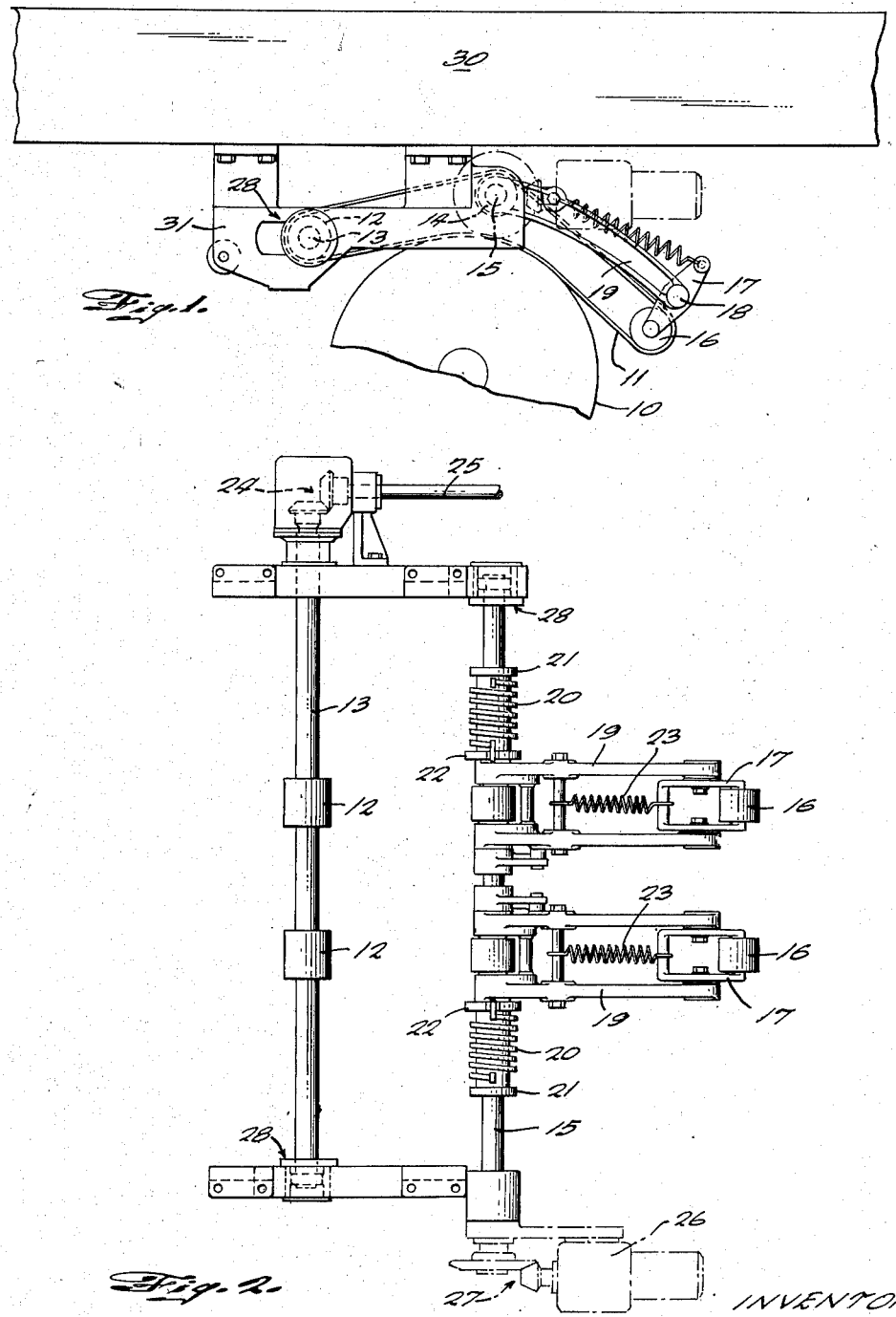

May 18, 1954  J. BRYER  2,678,565
MECHANISM FOR REPLACING ENDLESS BELTS
Filed Dec. 11, 1951  3 Sheets-Sheet 2

INVENTOR.
JACK BRYER
BY
Sawyer & Kennedy
ATTORNEYS.

INVENTOR.
JACK BRYER
BY
ATTORNEYS

Patented May 18, 1954

2,678,565

UNITED STATES PATENT OFFICE 2,678,565

MECHANISM FOR REPLACING ENDLESS BELTS

Jack Bryer, New York, N. Y., assignor to R. Hoe & Co., Inc., New York, N. Y., a corporation of New York Application December 11, 1951, Serial No. 261,019

2 Claims. (Cl. 74—216.5)

This invention relates to improvements in belt drives, and more specifically to means for changing the belts in such drives.

In many belt and pulley drive structures, the supporting and driving mechanism for the pulley shafts makes it impossible to replace a belt without cutting and splicing or, alternatively, without dismantling a good part of the structure in order to furnish access to an open shaft end. It is the general object of the present invention to make provision for replacing endless belts while still providing all necessary shaft supporting and driving mechanism for the various pulley shafts involved in the drive.

With this general object as well as others which will appear in the following description in mind, the invention consists in the combinations and arrangements of parts and details of construction which will now first be fully described with reference to the accompanying drawing and then be more particularly pointed out in the appended claims.

In the drawing:

Figure 1 is an end elevation view of a mechanism embodying the invention in a preferred form;

Figure 2 is a plan view of the mechanism of Figure 1;

Figure 3:
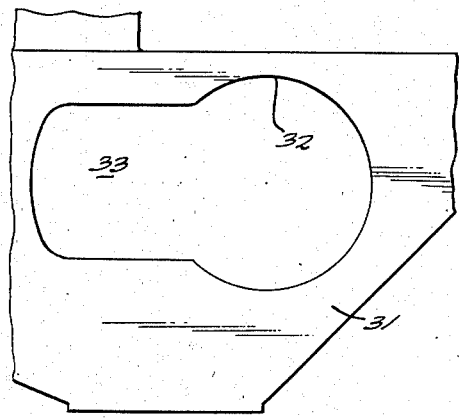
Figure 3 is a fragmentary end elevation, on an enlarged scale, and showing the frame structure of Figure 1, making provision for placement of a belt on a shaft.
Figure 4:
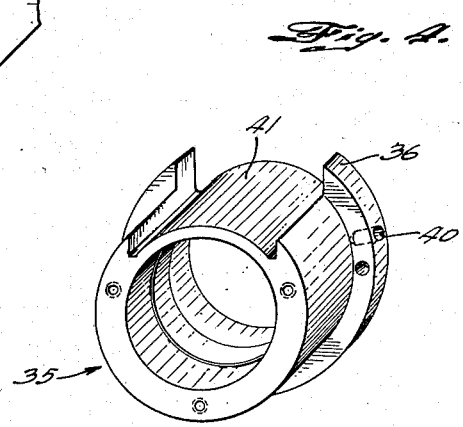
Figure 4 is a perspective, on the same scale as Figure 3, and showing a bushing which fits in the frame structure shown in Figure 3.

The invention is disclosed as applied to a belt tensioning and speed up mechanism for web rolls, such as used in supplying paper to printing presses and is illustrated with reference to a mechanism of this type, such as shown in prior Lundquist et al. Patent 2,155,430. In the drawing, there is shown only so much of the mechanism as is relevant to the present invention. There is indicated in Figure 1, at 10, part of the periphery of a web roll, the speeding up and tensioning control of which is effected by means of belts 11. These belts (omitted in Figure 2) pass around pulleys 12 keyed to a drive shaft 13, around pulleys 14 rotating freely on a shaft 15 and around pulleys 16 rotatably carried at one end of arms 17, which, in turn, are pivotally mounted at 18 on arms 19, which, in turn, are pivotally carried by the shaft 15. Springs 20 fixed at one end to collars 21 keyed to the shaft 15 and at the other to collars 22 fixed to the arms 19 are utilized to counterbalance the weight of the arms 19 and the parts carried thereby. The belt tension is maintained by springs 23 attached to the upper ends of arms 17, as indicated.

Shaft 13 which drives the belts at a speed slightly below that of the unwinding web, is connected through gearing 24 to a drive shaft 25 connected to the press or other drive in any convenient manner, and the angular position of shaft 15 is adjusted by a tension control motor 26, which varies the angular position of the shaft 15 through gearing 27. The tension control motor thus controls the angular position of the arms 19, to vary the pressure of the belts 11 on the roll periphery 10, as required to maintain web tension.

At the opposite ends of shafts 13 and 15 from the respective gearing 24 and 27, there is provided a special bearing support arrangement 28 to permit insertion and removal of the belts. This arrangement is the same for the two shafts and only the arrangement for shaft 13 will be described in detail.

The shafts 13 and 15 are supported from an upper frame member 30 by means of a bracket or rail 31 attached to the underside of the frame member and supporting the shafting. The bearings adjacent the drive gearing 24 and 27 may be of any conventional desired form, while the belt replacing bearings 28 are of the construction shown in Figures 3 and following. As there shown, the rail or bracket 31 is formed with a key hole shaped opening including a cylindrical portion 32 extending through about 270° of arc and a lateral opening 33 to one side thereof. A bushing 35 is carried in the cylindrical part 32 of the opening, being held therein axially of the shaft 13 by means of flange 36 and a cover plate 37 fastened to the bushing by screws 38. Screws 39 provide for holding the bushing in fixed angular position, as desired. The flange 36 is provided with sockets 40 to take a bar for turning the bushing for the purposes as described below. The flange 36, the body of the bushing 35 and the cover plate 37 are grooved to form an opening 41, coresponding to the lateral opening 33 in the frame, and extending radially inward of the bushing so as to provide a space for accommodating a belt 11 within the opening or recess 41 between the bushing and the wall of the cylindrical opening or seat 32 in any rotary position of the bushing. The end of shaft 13 is supported in bushing 35 by means of antifriction bearing 42, the inner race of which is held in position axially of the shaft by washer 43 secured to the shaft end. It will be understood that the shaft 13 is held in position axially by any suitable and usual arrangement at the oposite or drive end of the shaft.

When it is desired to change a belt, the worn belt may either be cut and removed, or removed without cutting by a reversal of the inserting procedure now to be described, as preferred.

Figure 7:
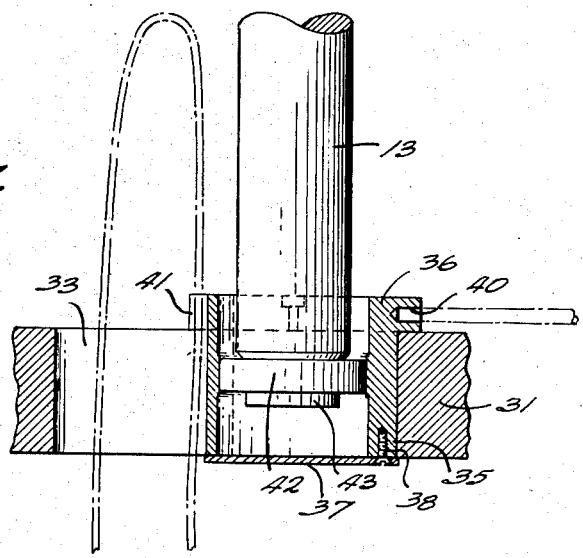
Figure 7 is a section on line 7—7 of Figure 5.
Figure 8:
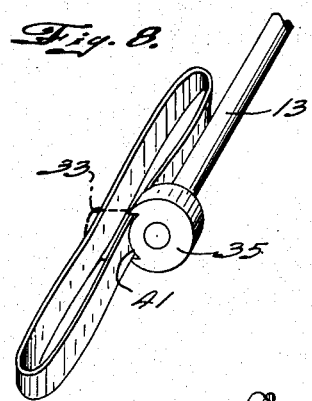
Figures 8 to 12 are floated diagrammatic perspectives showing the manner of belt insertion.

The screws 39 are first removed to permit turning of the bushing 35. The new belt is then inserted through opening 33 in the manner indicated in Figures 7 and 8, one course of the belt being placed within the groove or opening 41 in the bushing 35, and the other course being in the opening 33 of the rail 31. A bar is now inserted in an accessible socket 40 in the bushing flange 36 and the bushing is turned to carry the course of the belt that is in the opening 41 completely around the shaft 13.

Figure 9:
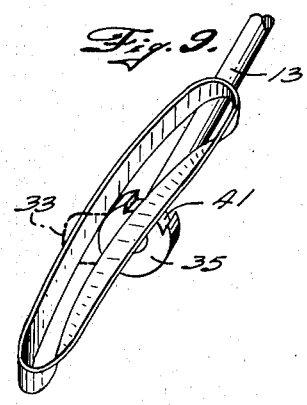

Figure 9 shows the position of the bushing and the belt when they have been turned through 120°, and it will be observed that the belt course which is in the recess 41 has been carried around within the wall of the opening 32 so the far end loop of the belt lies crosswise of the shaft 13.

Figure 10:
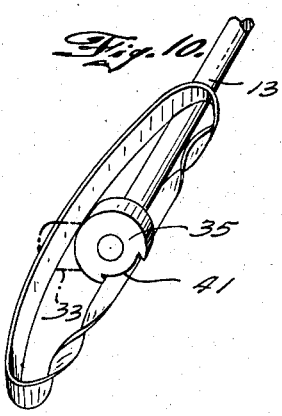
Figure 11:
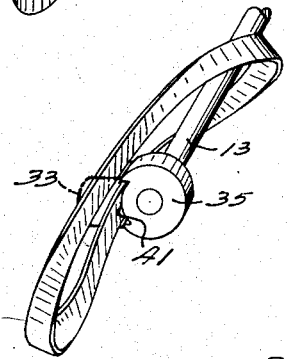
Figure 12:
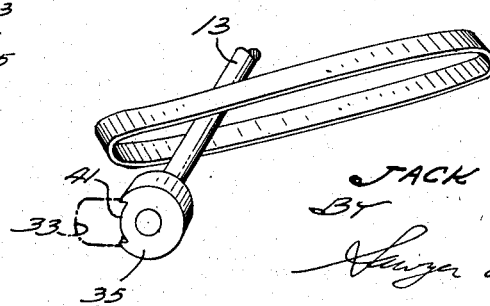

Continuation of the turning movement 120° further, carries the bushing to the position shown in Figure 10, with the belt partly around the bushing, and the near loop of the belt past the end of the shaft. It also produces a partial twist in the belt as shown. Further movement of the bushing turns the belt completely over when the turn is completed by the opening 41 reaching the recess 33. As shown in Figure 11, the belt has been partially untwisted after the turning, and by then pulling the belt entirely through the recess 33, it will surround the shaft at a point inside the bushing as shown in Figure 12. The belt may then be passed along to the other end of the shaft.

The belt having reached the far end of shaft 13, a loop is inserted through opening 33 in the bearing structure at the far end of shaft 15 and a procedure the same as just described with reference to shaft 13 is there carried through. The belt will then encircle both shafts 13 and 15 and may be brought back and placed around the pulleys in driving relation thereto. It will be observed that if there is no web roll periphery 10 in position, the generally triangular pulley construction may be collapsed sufficiently by rotating the arms 19 downwardly so as to permit this.

Figure 5:
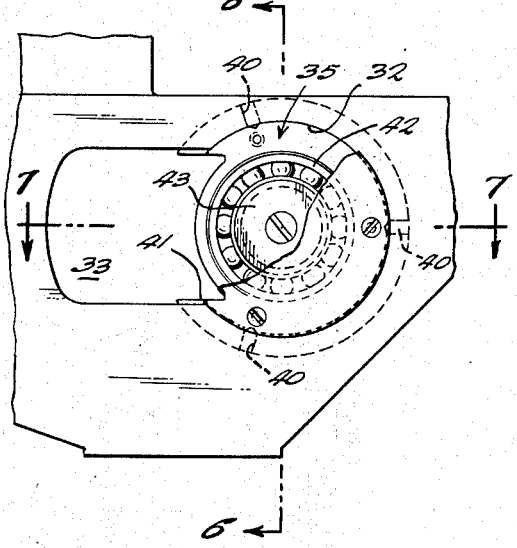
Figure 5 is an end elevation showing the bushing, shaft and bearing in place in the frame structure of Figure 3.
Figure 6:
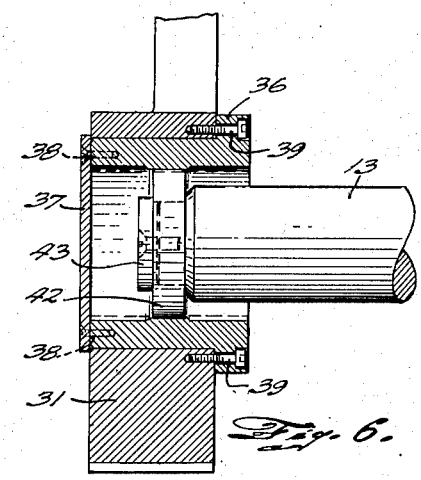
Figure 6 is a section on line 6—6 of Figure 5.

The bushings 35 may now again be fastened in the position of Figure 5 by means of the screws 39.

What is claimed is:

1. In a belt and pulley drive, mechanism for supporting a shaft end while making provision for placing an endless belt around the shaft, comprising a bushing for suporting a shaft end, and a frame element surrounding and having a seat rotatably supporting the bushing, the bushing having a recess for accommodating a belt course between the bushing and the seat in any angular position of the bushing, and the frame element having an opening into the seat for accommodating a belt and permitting insertion of a course thereof in the recess of the bushing.

2. In a belt and pulley drive, mechanism according to claim 1, for an end of each of two shafts for placing an endless belt around the two shafts.

References Cited in the file of this patent

UNITED STATES PATENTS

| Number | Name | Date |
| --- | --- | --- |
| 1,986,325 | Dallwigk, Jr. | Jan. 1, 1935 |
| 2,010,796 | Bourque | Aug. 6, 1935 |
| 2,141,505 | Bobrzyk | Dec. 27, 1938 |